United States Patent [19]

Druschel

[11] 4,218,163

[45] Aug. 19, 1980

[54] ROTARY CUTTING TOOL WITH OFFSET CUTTING ELEMENT

[76] Inventor: William O. Druschel, Raemont Rd., Granite Springs, N.Y. 10527

[21] Appl. No.: 906,771

[22] Filed: May 17, 1978

[51] Int. Cl.² .............................................. B23B 27/00
[52] U.S. Cl. ..................................... 408/196; 408/201
[58] Field of Search .............. 408/196, 186, 201, 200, 408/203, 189, 224, 225, 231, 233

[56] References Cited

U.S. PATENT DOCUMENTS

| 2,811,054 | 10/1957 | Townsend | 408/201 |
| 2,937,545 | 5/1960 | Rauer et al. | 408/231 X |
| 3,358,531 | 12/1967 | Schaffler | 408/201 |

FOREIGN PATENT DOCUMENTS 664789  1/1952  United Kingdom ..................... 408/186

*Primary Examiner*—Gil Weidenfeld
*Attorney, Agent, or Firm*—Price, Heneveld, Huizenga & Cooper

[57] ABSTRACT

A cutting tool includes a shank with one end adapted to be secured to a rotary chuck. Spaced inwardly from an opposite end is a transversely extending radially offset aperture extending through the shank for receiving a cutting tool. A threaded aperture extends into the shank axially from the opposite end for receiving a set screw for securing the cutting tool within the offset aperture. A cup-shaped pilot bushing is provided and fits over the opposite end of the shank and includes means interengaging the cutting tool and an aperture aligned with the threaded aperture of the shank so that the bushing can be interlockably secured to the shank. In some embodiments, the leading edges of the shank and the pilot bushings are chamfered and knurled to define a ream for use of the cutting tool with out-of-round and/or undersized pilot holes. A cutting tool so formed can be employed as a universal drill for enlarging pilot holes within an infinitely adjustable range of sizes.

12 Claims, 9 Drawing Figures

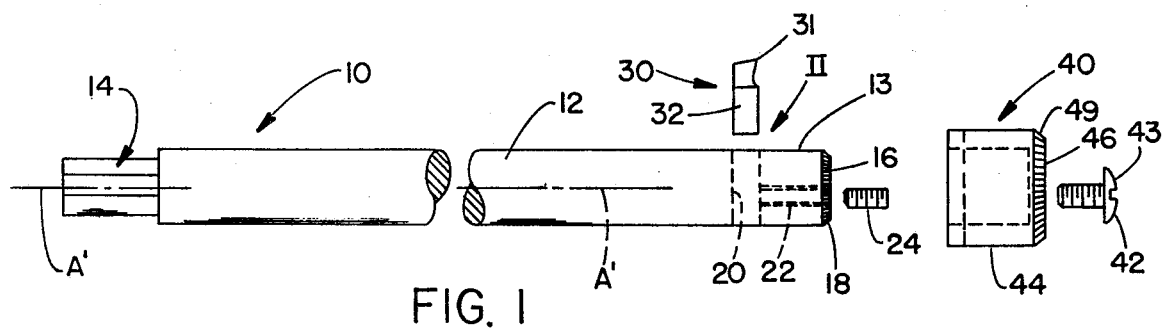
FIG. 1
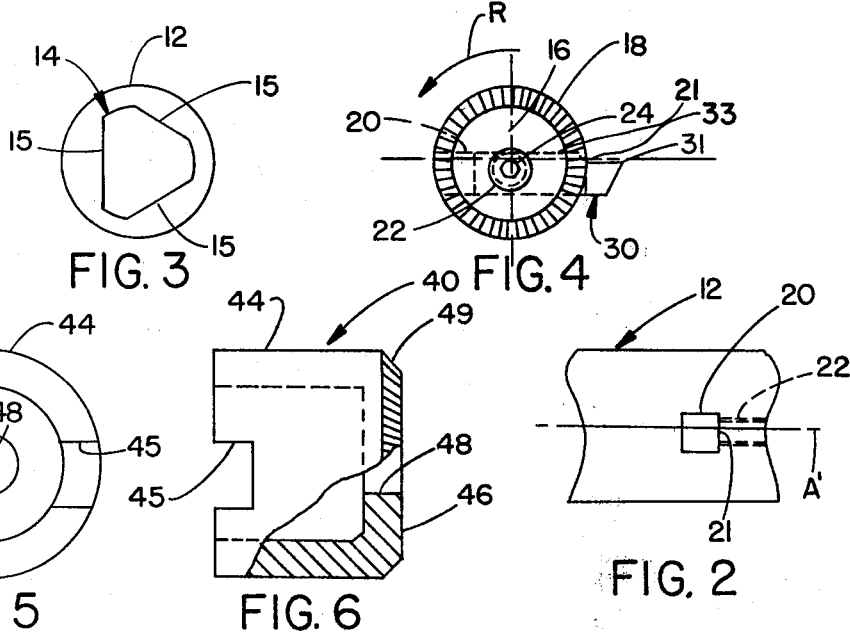
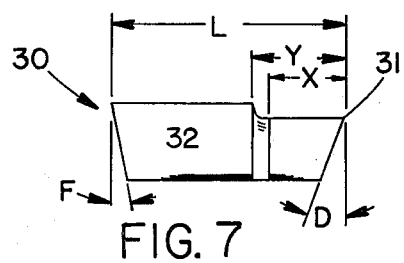
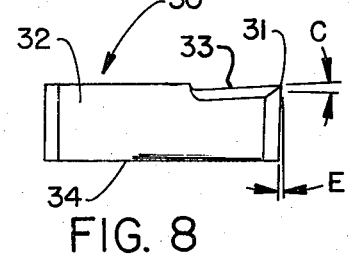
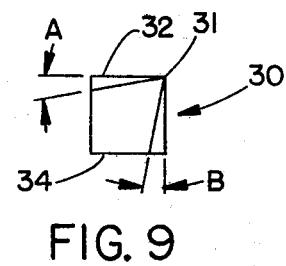

ROTARY CUTTING TOOL WITH OFFSET CUTTING ELEMENT

BACKGROUND OF THE INVENTION

The present invention relates to a cutting tool and particularly to an adjustable rotary drill.

When drilling or boring relatively large diameter holes, it has been found that standard twist drills do not readily provide accurate round holes and are very difficult to employ with light duty drilling apparatus such as hand electric drills or small drill presses.

In order to accurately drill relatively large holes, therefore, a twist drill is typically used only to form a relatively small diameter pilot hole which is subsequently enlarged by a cutting tool. There are available several types of cutting tools having adjustable cutting elements for enlarging pilot holes to the desired size. Representative of such prior art are U.S. Pat. Nos. 2,937,545, issued May 24, 1960, to P. A. Rauer, et al; 3,358,531, issued Dec. 19, 1967, to W. Schaffler; 2,811,054, issued Oct. 29, 1957, to L. L. Townsend; and 3,318,175, issued May 9, 1967, to S. A. Cogsdill. These prior art cutting tools either provide specialized cutting elements which are relatively large and thereby suffer to some extent the same problems as a conventional twist drill or involve relatively complex structure for the mounting of the adjustable cutting elements to the shank of the drill. Further, these cutting tools are not suitable for use in pilot holes which may be out-of-round and/or undersized.

SUMMARY OF THE INVENTION

The present invention overcomes the disadvantages of the prior art by providing an improved and simplified cutting tool in the nature of a universal drill having a shank adapted to be secured at one end within a rotary chuck and having spaced from its opposite end a transversely extending and offset aperture for receipt of a cutting element. Extending axially from the opposite end and communicating with the transverse aperture is a threaded aperture for receiving a set screw securing the cutting tool within the offset aperture and permitting the tool to be adjustably extended radially from the shank for adjustment of the hole size. The shank extending from either side of the cutting tool defines a pilot section for alignment of the tool in a pilot hole. A cup-shaped pilot bushing can be provided and fitted over the opposite end and is notched to interengage the cutting tool for lockably indexing the pilot bushing to the opposite end of the shank. The pilot bushing includes aperture means at its end for alignment with the axially extending aperture of the shank for securing the pilot bushing to the shank by conventional fastening means.

In some embodiments of the invention, the outer peripheral edge of the opposite end of the shank and the associated pilot bushing is chamfered and knurled to permit the cutting tool to be used with out-of-round and/or undersized pilot holes by reaming the pilot holes.

The resultant structure provides a greatly simplified tool which can employ adjustable cutting elements to provide an adjustable hole diameter and which can be easily and conveniently used with common drilling equipment. The drilled hole is accurately obtained without subsequent finishing being required. The cutting elements can easily be redressed without affecting the size or accuracy of holes drilled thereby and by use of different sized pilot bushings, the tool can be used with different sized pilot holes. By mounting the cutting element within the offset aperture, the drill provides uniform chips which break away as the pilot hole is enlarged.

These and other features, advantages, and objects of the present invention can best be understood by reference to the following description thereof together with the drawings in which:

BRIEF DESCRIPTION OF THE DRAWINGS

FIG. 1 is an exploded partly broken away side elevational view of a cutting tool embodying the present invention;

FIG. 2 is an enlarged fragmentary plan view of a portion of the shank shown in FIG. 1;

FIG. 3 is an enlarged left end view of the shank shown in FIG. 1;

FIG. 4 is an enlarged right end elevational view of the shank shown in FIG. 1;

FIG. 5 is an enlarged left end view of the pilot bushing shown in FIG. 1;

FIG. 6 is an enlarged side elevational view partly in cross section of the pilot bushing shown in FIG. 1;

FIG. 7 is an enlarged plan view of a cutting element employed shown in FIG. 1;

FIG. 8 is a front elevational view of the cutting element shown in FIG. 7; and

FIG. 9 is a right side elevational view of the cutting element shown in FIG. 8.

DETAILED DESCRIPTION OF THE PREFERRED EMBODIMENT

Referring initially to FIG. 1, there is shown a cutting tool 10 embodying the present invention which includes a shank 12 comprising a rod having a diameter in the preferred embodiment of ½ inch and an overall length of approximately 5.87 inches. In the preferred embodiment, the shank is made of C1215 cold rolled steel case hardened to a depth of 0.005–0.008 inches with a black oxide finish and a corrosion resistant oil dip. One end 14 of the shank is turned down to a diameter of approximately 0.375 inches for a length of 0.63 inches and as seen in FIG. 3, three equally spaced flats 15 are provided for adapting shank 12 to fit standard drill chucks. The opposite end 16 of the shank includes a 45° chamfered leading edge and is knurled at 18 with a 32 pitch knurl as seen in FIGS. 1 and 4.

As seen in FIGS. 1 and 2, spaced inwardly from end 16 approximately 0.435 inches is a transversely extending radially offset aperture 20 extending through the shank body 12. Aperture 20 is offset from the center line or axis A' of the shank and is formed by first drilling the aperture and then broaching it to define a keyed aperture. In the preferred embodiment, the aperture is square, having sides with a width of 0.197 inches. The aperture's shape and size can be varied somewhat but is conveniently selected to accommodate standard cutting tool stock. Extending axially inwardly from end 16 and communicating with sidewall 21 (FIG. 2) of aperture 20 is a threaded aperture 22 for threadably receiving a set screw 24 which lockably secures a cutting element 30 within aperture 20. The length of set screw 24 is significantly shorter than the length of threaded aperture 22 such that a pilot bushing 40 can be added to the pilot end 13 of the cutting tool 10 and secured thereto by means of a fastening screw 42 which can be threaded into aperture 22 behind set screw 24.

The cutting element 30 is shown in detail in FIGS. 7, 8, and 9 and has a square cross section as shown in FIG. 9. The dimensions of the cutting tool are shown in the following table in which reference numerals A through L, X, and Y correspond to those shown in FIGS. 7, 8, and 9 with two different sized cutting elements of the preferred embodiment being disclosed.

| Cutting Element | Side Clearance A | Side Rake B | Back Rake C | Cutter End Clearance D | Cutter End Clearance E | Back End Clearance F | Length L | Min. Straight Cutting Edge X | Max. Grind Y |
| --- | --- | --- | --- | --- | --- | --- | --- | --- | --- |
| 1 | 10° | 15° | 4° | 20° | ~2° | 10° Min. 20° Max. | .480 | .130 | .190 |
| 2 | 10° | 15° | 4° | 20° | ~2° | 10° Min. 20° Max. | .680 | .180 | .230 |

The cutter elements are made from 3/16 inch square high speed tool bit stock although it is to be understood that the stock can be suitably hardened or carbide plated to provide varying degrees of hardness and durability depending upon the nature of usage of the cutting tool. The angle D (FIG. 7) assures a clean breakthrough at the end of a hole being enlarged.

In order to adapt cutting tool 10 for different sized pilot holes, one or more different sized pilot bushings 40 are provided. Each of the pilot bushings 40 comprise a generally cup-shaped member having cylindrical sidewalls 44 with an interior dimension of about 0.501 inches in the preferred embodiment. The end 46 of the bushing includes an axially extending aperture 48 (FIGS. 5 and 6) for securing the pilot bushing to opposte end 16 of the shank by means of fastening screw 42. Aperture 48 is significantly larger than aperture 22 and can be centered in bushing 40 and still permit screw 42 with an enlarged head 43 to fit into aperture 22 and secure the bushing to the shank. The cylindrical sidewalls 44 include offset transversely extending notches 45 at the trailing edge for extending around three sides the cutting element 30 permitting the pilot bushing to extend fully through the cutting zone by surrounding the cutting element 30. Notches 45 also serve to lockably index the pilot bushing to the shank for rotation therewith. For such purposes, the length of wall 44 is sufficient such that when the inner surface of end wall 46 engages the opposite end 16 of the shank, notches 45 surround the cutting element 30. The leading edge corner of the pilot bushing is chamfered at 45° and knurled at 49 such that the shank and/or the shank with the pilot bushing thereon will serve as a ream for slightly out-of-round and/or undersized pilot holes facilitating use of the cutting tool.

In operation, the cutting element 30 is inserted into aperture 20 of shank 12 with the cutting tip 31 facing the opposite end 16 of the shank in a position for leading the cutting element 30 in its rotation in the workpiece. The cutting element 30 is adjustably positioned in aperture 20 to extend from the shank a distance to provide the desired diameter hole. This adjustment can be achieved, for example, by employing a caliper to ascertain the extension of the cutting element from the shank and adding twice this distance to the diameter of the shank to provide the desired hole diameter. Once the cutting element is adjusted for the desired hole size, set screw 24 is tightened against the forward wall 32 of the cutter element which forces the rear wall 34 against the rear wall of keyed aperture 20 thereby securing the cutting element to the shank in the adjusted position within aperture 20.

If the workpiece includes a pilot hole of ½ inch diameter in the preferred embodiment, the pilot section 13 of the shank will fit directly into the hole and once the chuck end 14 of the cutting tool has been secured in the drilling mechanism, the cutting tool can be employed for enlarging the pilot hole to the selected diameter. If, however, the pilot hole has a larger diameter, a pilot bushing 40 is employed by positioning it over the pilot end 13 of the shank and securing it in interlocked position with the cutting element 30. Screw 42 is tightly threaded into aperture 22 to hold the bushing in place over end 16 of the shank. In the event the pilot hole is not perfectly round or is slightly undersized, the knurling 16 or 49 on the shank or pilot bushing, respectively, will enlarge and round out the pilot hole thereby accurately guiding the cutting tool through the workpiece. The knurling, like the cutting element, permits the shank to be rotated in either direction.

In the preferred embodiment, the cutting element 30 had an overall length of about 0.7 inches to permit a pilot hole 0.5 inches in diameter to be enlarged to a maximum of approximately 1.25 inches by the cutting tool of the present invention. Naturally, the cutting element can be either shortened or lengthened to provide larger maximum hole sizes. By offsetting the transversely extending aperture 20 about 0.065 inches in the preferred embodiment (about 10% of the shank diameter is typical) the cutting edge 31 of the cutting element is coincident with a true radius of the hole being enlarged, as illustrated in FIG. 4 thereby providing a uniform readily breakable chip quality to improve the hole formed by the cutting tool as well as make it easier to set to the desired dimension and to use.

One feature of the present design is that the shank 12 serves as a pilot along its entire length permitting the cutting tool to be employed from the back side of a workpiece toward the operator. Further, it allows for the rework of an existing worn hole or otherwise unusable hole by clamping a piece of metal containing a ½ inch pilot hole over the workpiece and using the drill in the manner described above. An additional operating feature is that of being able to cross drill a hole in a tubular workpiece. Again, this can only be done backwards because in the forward direction the pilot hole is lost part way through the near wall preventing further drilling.

It will become apparent to those skilled in the art that various modifications to the preferred embodiment of the invention can be made without departing from the spirit or scope thereof as defined by the appended claims.

The embodiments of the invention in which an exclusive property or privilege is claimed are defined as follows.

1. A rotary cutting tool comprising:

a rod-shaped shank having one end for attachment to a chuck and an opposite end, said shank including a transversely extending aperture spaced inwardly from said opposite end and having its axis offset from the longitudinal axis of said shank for receiving a cutting element and an axially extending threaded aperture extending inwardly from said opposite end of said shank into communication with said transversely extending aperture for receiving a set screw; and a cutting element having a cutting edge and having a cross section shaped to fit within said transversely extending offset aperture and to extend outwardly from said shank and adjustably held in said shank by said set screw to adjust the size of a hole formed by said cutting tool with said cutting element being held in said offset aperture to position said cutting edge on a true diameter of a hole being formed by said cutting tool, said transversely extending aperture having a plurality of walls to define a keyed aperture for indexing said cutting element in said keyed aperture, and said opposite end of said shank being knurled at its junction with the cylindrical sidewall of said shank.

2. A rotary cutting tool comprising:

a rod-shaped shank having one end for attachment to a chuck and an opposite end, said shank including a transversely extending aperture spaced inwardly from said opposite end and having its axis offset from the longitudinal axis of said shank for receiving a cutting element and an axially extending threaded aperture extending inwardly from said opposite end of said shank into communication with said transversely extending aperture for receiving a set screw; and a cutting element having a cutting edge and having a cross section shaped to fit within said transversely extending offset aperture and to extend outwardly from said shank and adjustably held in said shank by said set screw to adjust the size of a hole formed by said cutting tool with said cutting element being held in said offset aperture to position said cutting edge on a true diameter of a hole being formed by said cutting tool, said transversely extending aperture having a plurality of walls to define a keyed aperture for indexing said cutting element in said keyed aperture, and said shank being chamfered and knurled at the junction of said opposite end and the sidewall of said shank.

3. The apparatus as defined in claim 4 and further including a cup-shaped pilot bushing having a front wall with an aperture for receiving a fastening screw for securing said bushing to said shank, said pilot bushing having a cylindrical wall extending rearwardly toward said cutting element when said bushing is mounted to said shank.

4. The apparatus as defined in claim 3 wherein the junction of said front wall and said cylindrical wall of said bushing is knurled.

5. The apparatus as defined in claim 4 wherein said cylindrical sidewall of said pilot bushing is notched to permit said bushing to extend through the cutting zone defined by said cutting element.

6. An adjustable drill comprising:

a rod-shaped shank with one end for attachment of said shank within a chuck and an opposite end chamfered and knurled at its junction with the cylindrical sidewall of said shank, said shank including a transversely extending aperture spaced inwardly from said opposite end and offset from the axis of said shank for receiving a cutting element, wherein said transversely extending aperture has a plurality of walls to define a keyed aperture for indexing said cutting element in said keyed aperture, said shank including an axially extending threaded aperture extending inwardly from said opposite end of said shank into communication with said transversely extending aperture for receiving a set screw; and a cutting element having a cross section shaped to fit within said transversely extending aperture and to extend outwardly from said shank at a rearward rake angle and adjustably held in said shank by said set screw to adjust the size of a hole formed by said cutting tool.

7. The apparatus as defined in claim 6 and further including a cup-shaped pilot bushing having a front wall with an aperture for receiving a fastening screw for securing said bushing to said shank, said pilot bushing having a cylindrical wall extending rearwardly toward said cutting element when said bushing is mounted to said shank.

8. The apparatus as defined in claim 7 wherein the junction of said front wall and said cylindrical wall of said bushing is knurled.

9. The apparatus as defined in claim 7 wherein said cylindrical sidewall of said pilot bushing is notched to permit said bushing to interlock with said cutting element.

10. The apparatus as defined in claim 9 wherein said transversely extending aperture and said cutting element have square cross sections.

11. The apparatus as defined in claim 10 wherein said one end of said shank is machined to define equally spaced flats for facilitating securing of said shank to a chuck.

12. A rotary cutting tool comprising:

a rod-shaped shank having one end for attachment to a chuck and an opposite end, said shank including a transversely extending aperture spaced inwardly from said opposite end for receiving a cutting element and an axially extending threaded aperture extending inwardly from said opposite end of said shank into communication with said transversely extending aperture for receiving a set screw;

a cutting element having a cross section shaped to fit within said transversely extending aperture and to extend outwardly from said shank and adjustably held in said shank by said set screw to adjust the size of a hole formed by said cutting tool; and a cup-shaped pilot bushing having a front wall with an aperture positioned for receiving a fastening screw extending in said axially extending threaded aperture of said shank for securing said bushing to said shank, said pilot bushing having a cylindrical wall extending rearwardly toward said cutting element when said bushing is mounted to said shank; and wherein the junction of said front wall and said cylindrical wall of said bushing is knurled.

* * * * *

UNITED STATES PATENT AND TRADEMARK OFFICE
CERTIFICATE OF CORRECTION

PATENT NO. : 4,218,163
DATED : August 19, 1980
INVENTOR(S) : William O. Druschel It is certified that error appears in the above-identified patent and that said Letters Patent are hereby corrected as shown below:

Column 2, line 56

After "aperture". insert --As seen in Fig. 4, aperture 20 has an edge 21 adjacent or approximately coincident with a diameter line D of the shank.--

Column 3, line 57

After "workpiece" insert --As seen in Fig. 4, cutting element 30 has a cutting edge 33 substantially on the diameter line of the shank and a maximum cross-sectional width at the cutting edge

UNITED STATES PATENT AND TRADEMARK OFFICE
CERTIFICATE OF CORRECTION

PATENT NO. : 4,218,163
DATED : August 19, 1980
INVENTOR(S) : William O. Druschel It is certified that error appears in the above—identified patent and that said Letters Patent are hereby corrected as shown below:

substantially equal to the maximum cross-sectional width of the aperture 20.--

Column 4, line 41

"31" should be --33--

Signed and Sealed this

Ninth Day of December 1980

[SEAL]

Attest:

Attesting Officer

SIDNEY A. DIAMOND

Commissioner of Patents and Trademarks